United States Patent [19]
Clyne

[11] Patent Number: 5,645,664
[45] Date of Patent: Jul. 8, 1997

[54] HIGH MOISTURE EMISSION CONCRETE FLOOR COVERING AND METHOD

[75] Inventor: William Robert Clyne, Los Gatos, Calif.

[73] Assignee: Floor Seal Technology, Inc., San Jose, Calif.

[21] Appl. No.: 619,344

[22] Filed: Mar. 21, 1996

[51] Int. Cl.⁶ .................................................. E04F 15/00
[52] U.S. Cl. ................. 156/71; 52/741.41; 52/746.1; 156/276; 427/180; 427/203; 427/407.3
[58] Field of Search ............................ 156/71, 276, 279; 427/203, 206, 180, 407.3; 52/741.41, 746.1, 309.17, 169.14

[56] References Cited

U.S. PATENT DOCUMENTS

| | | | |
|---|---|---|---|
| 3,080,253 | 3/1963 | Dietz | 427/203 |
| 3,666,521 | 5/1972 | Weyna | 427/203 |
| 4,160,058 | 7/1979 | K-Gall . | |
| 4,409,772 | 10/1983 | Boyack | 156/71 |
| 4,597,817 | 7/1986 | Larsen | 156/71 |
| 4,897,313 | 1/1990 | Wiercinski . | |
| 5,109,088 | 4/1992 | Ohwada et al. . | |
| 5,143,757 | 9/1992 | Skinner | 52/746.1 |
| 5,258,424 | 11/1993 | Yagi et al. . | |

FOREIGN PATENT DOCUMENTS 4-155052 A  5/1992  Japan .

OTHER PUBLICATIONS

Delmonte, John, Concrete, 12,45 (Jun. 1949).

*Primary Examiner*—Daniel Stemmer
*Attorney, Agent, or Firm*—William B. Walker

[57] ABSTRACT

A method for applying a high moisture permeability floor covering material to a concrete surface and product thereof. The method comprises the steps of first applying a layer of inert fibers to the concrete surface. To the fiber layer is applied an aqueous acrylate polymer emulsion to form localized bonding penetrations of the emulsion through the layer of fibers to the concrete surface and to form a continuous coating of emulsion on the upper surface of the layer of fibers. The coating is applied so that the coated fiber layer has interconnected moisture transmission passageways communicating with the concrete surface and extending throughout the fiber layer for redistributive diffusion under the continuous coating of moisture vapor from high emission surfaces of the concrete to lower emission surfaces of the concrete. A further layer of high viscosity aqueous acrylate polymer emulsion is applied to said continuous coating and set. A floor covering adhesive and floor covering sheet or tiles can then be applied to the set emulsion surface.

7 Claims, 1 Drawing Sheet

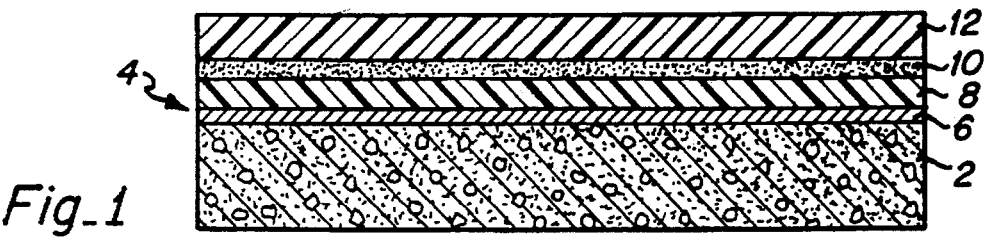
Fig_1
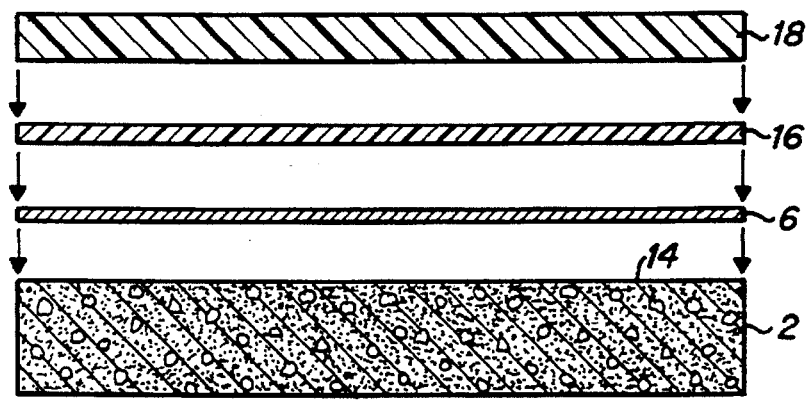
Fig_2
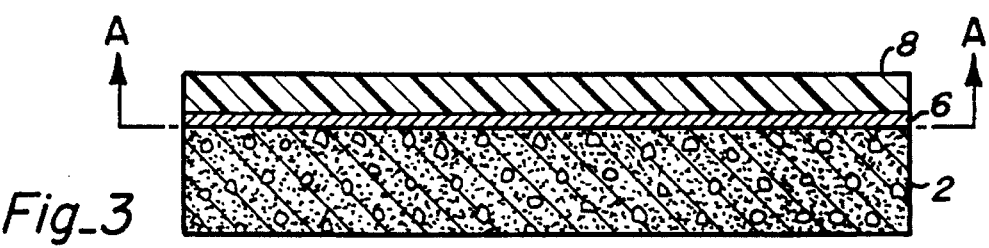
Fig_3
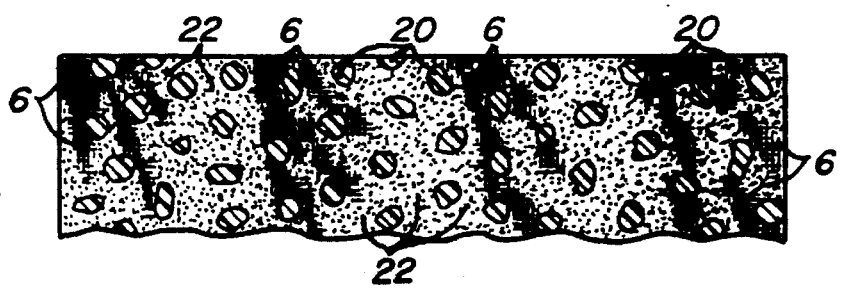
Fig_4
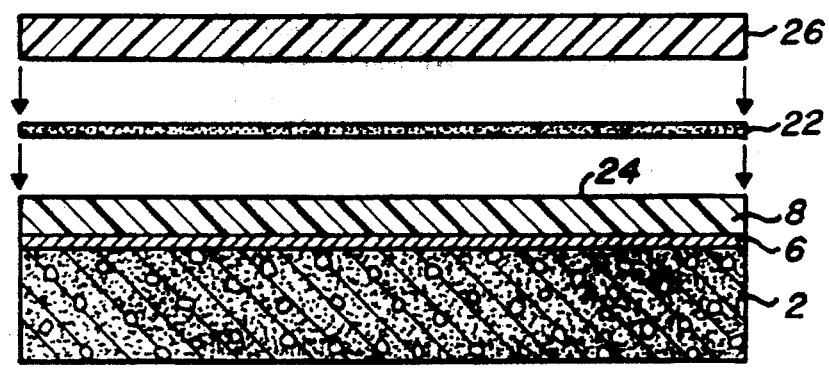
Fig_5

HIGH MOISTURE EMISSION CONCRETE FLOOR COVERING AND METHOD

FIELD OF THE INVENTION

This invention relates to improved floor coverings for concrete surfaces and to novel methods for applying the floor coverings. In particular, this invention relates to a novel process for applying floor covering sheets and tiles to high moisture emission concrete floor surfaces and to the more reliable floor covering bonding with the floor surface obtained therewith.

BACKGROUND OF THE INVENTION

Floor covering sheets and tiles are bonded to concrete floor surfaces in industrial and manufacturing facilities to provide a dust-free surface which can be easily cleaned and maintained. The most conventional sheets and tiles are made with vinyl polymers and are commonly references as vinyl sheet and tiles. Moisture collection under the vinyl floor coverings, particularly on newly formed concrete, causes delamination of the vinyl to floor bond and formation of large raised surface areas or bubbles along the vinyl surface. Moisture collection occurs when the water vapor emitted from each area of the concrete surface exceeds the maximum moisture diffusion rate of the floor covering for that area. The maximum moisture emission rating for conventional vinyl sheets and mastic floor coverings is usually up to about 3 to 4 pounds of water vapor per 24 hours per 1000 square feet of vinyl sheet (4 lbs. water/1000 sq.ft./24 hrs.).

Prior methods for applying vinyl flooring materials generally involve the application of an adhesive mastic directly to the concrete surface and the placement of the vinyl sheeting and tiles directly to the adhesive layer. We have discovered a previously unrecognized cause of separation of these floor coverings from the underlying surface. Moisture emitted from each portion of the floor surface must pass upwardly through the adhesive layer and tile to escape, and localized emissions exceeding the rating of the floor covering causes a collection of condensate, delamination and bubbling. These causes of floor covering failures have continued to be a serious problem until the development of the methods and products of this invention.

OBJECTS AND SUMMARY OF THE INVENTION

One object of this invention is to provide an improved process for applying floor coverings to concrete surfaces which promotes lateral diffusion of moisture emitted from the concrete surface, thereby redistributing the moisture diffusion load over the entire floor covering and eliminating locally isolated moisture collections.

It is another object of this invention to provide a process for applying an improved moisture accommodating process floor covering to concrete surfaces.

It is another object of this invention to provide an improved floor covering which is more tolerant of moisture emissions from concrete surfaces.

In summary, the method of this invention for applying a high moisture permeability floor covering material to a concrete surface comprises the steps of first applying a layer of inert fibers to the concrete surface having a weight of from 0.5 to 1.0 ounces/square foot. To the upper surface of the fiber layer is applied an aqueous acrylate polymer emulsion to form localized bonding penetrations of the emulsion through the layer of fibers to the concrete surface and to form a continuous coating of emulsion on the upper surface of the layer of fibers. The coating is applied so that penetration of the glass fibers is incomplete in most areas, and the coated fiber layer is left with interconnected moisture transmission passageways communicating with the concrete surface and extending laterally throughout the fiber layer. These passageways provide redistributive diffusion under the continuous coating of moisture vapor from high emission surfaces of the concrete to lower emission surfaces of the concrete.

Preferably, any trapped air masses are expelled from under the layer of fibers during or after the initial coating is applied to the fiber layer, and the concrete floor has been scarified prior to applying the fiber layer thereto. The applied emulsion is then allowed to set.

The preferred method includes the additional steps of applying a further layer of high viscosity aqueous acrylate polymer emulsion to said continuous coating and permitting the further layer of aqueous acrylate polymer emulsion to set.

A floor covering adhesive can then be applied to the set emulsion surface followed by floor covering sheet or tiles.

Preferably, the inert fibers are inorganic fibers having a relatively short length such as chopped glass fibers having a weight of 0.6 to 0.9 ounces/sq.ft.

The covered concrete floor surface of this invention comprises a fiber layer in contact with the upper surface of the concrete floor. The upper surface of the fiber layer has a continuous acrylate polymer coating, a portion of the fiber having localized bonding penetrations of acrylate polymer extending from the coating layer to the concrete floor surface and bonded thereto. The coated fiber layer has interconnected moisture transmission passageways communicating with the concrete surface and extending throughout the fiber layer for redistributive diffusion under the continuous coating of moisture vapor from high emission surfaces of the concrete to lower emission surfaces. Preferably at least fifty percent of the concrete surface is exposed to the passageways.

The covered concrete floor surface can have a floor covering sheet or tile bonded thereto by an adhesive layer.

Optimally, the inert fibers are chopped glass fibers, optionally having a weight of from 0.7 to 0.8 oz./sq.ft.

BRIEF DESCRIPTION OF THE DRAWINGS

FIG. 1 is a cross-sectional representation of a concrete floor having floor covering thereon applied according to this invention.

FIG. 2 is a cross-sectional representation of the application of a high moisture emission intermediate floor covering according to the method of this invention.

FIG. 3 is a cross-sectional representation of the intermediate floor covering formed from the components shown in FIG. 2.

FIG. 4 is a cross-sectional area of the floor covering in FIG. 3, the section line taken along the line A—A thereof.

FIG. 5 is a cross-sectional representation of the application of a floor covering tile or sheet to the intermediate floor covering shown in FIG. 3.

DETAILED DESCRIPTION OF THE INVENTION

FIG. 1 is a cross-sectional representation of a concrete floor having floor covering thereon applied according to this invention. In general, the concrete floor 2 is covered with several successive layers. The intermediate coating layer 4 is bonded to the upper surface of the concrete layer 2. As shown in greater detail hereinafter, the intermediate coating layer 4 is a continuous acrylate polymer coating 8 on a fiber layer 6, a portion of the fiber layer 6 having localized bonding penetrations of acrylate polymer extending from the coating layer to the concrete floor surface and bonded thereto. The coated fiber layer has interconnected moisture transmission passageways communicating with the concrete surface and extending throughout the fiber layer for redistributive diffusion under the continuous coating of moisture vapor from high emission surfaces of the concrete to lower emission.

As the wear surface, a polymer sheet or tiles such as vinyl sheets or tiles 12 are bonded to the polyacrylate layer 8 by adhesive 10.

FIG. 2 is a cross-sectional representation of the application of a high moisture emission intermediate floor covering according to the method of this invention. The upper surface 14 of the concrete floor 2 is preferably scarified, preferably by conventional particle blasting, to remove any contaminations or coatings therefrom. It can thereafter be resealed by applying a conventional alkali metal silicate solution such as sodium silicate or potassium silicate solution to reduce moisture emission rates.

The method of this invention can be used for covering any concrete surface. It is particularly useful for covering concrete floor surfaces which have been found to have high moisture emission rates. Moisture emission rates can be determined by using the moisture testing kit and method described in, commonly owned, copending application Ser. No. 08/557,389 filed Nov. 13, 1995. This testing kit provides a moisture emission rate measurement which can predict excessive moisture emission and a risk of floor covering delamination when a floor covering is applied according to the prior art methods and for which the method of this invention is most advantageous.

A fiber layer 6 is applied to the concrete surface. Any inert fiber can be used including fibers made of organic polyers such as polyolefins, polyesters, polyamides, polyvinyl fibers such as polyvinyl alcohol and polyvinyl chloride, rayons, and the like; and inorganic fibers such as ceramic fibers, spun mineral fibers, asbestos fibers, and glass fibers.

The preferred fibers are glass fibers having a hydrophilic, watersoluble size or binder. The fibers are preferably applied in the form of a thin layer of non-woven chopped glass fibers since relatively short chopped fibers have been found to allow release of trapped air more easily than woven fiber layers. The optimum results have been achieved with glass fibers layers having a weight of about 0.5 to 1.0 oz./sq.ft. The preferred fiber layer weight is about 0.6 to 0.8 oz./sq.ft, and the optimum weight range is from about 0.7 to 0.8 oz./sq.ft. The fiber layer should be sufficiently thick to permit gas diffusion therethrough but sufficiently thin to provide a strong, solid intermediate floor covering.

An aqueous acrylate polymer primary emulsion 16 is then applied to the upper surface layer of fibers 6 to form a continuous coating thereon and to form localized bonding penetrations of the emulsion through the layer of fibers to the concrete surface. The primary emulsion can be applied to the fiber surface with any conventional applicator such as a flexible blade (e.g., a squeegee) or roller, care being taken to prevent disruption of the fiber layer.

The aqueous acrylate polymer emulsion can be any conventional acrylate coating emulsion, that is, emulsions or latexes contining polyacrylate particles or beads. The preferred acrylate coating emulsions are made from polyacrylates obtained from Rohm & Haas under the name Polyacrylate No. 928. The preferred primary coating emulsion has a viscosity sufficiently thin or low to permit localized penetrations by the emulsion of the fiber layer so the emulsion in these localized penetrations extends from the continuous coating layer to the concrete surface 14 so as to achieve bonding thereto. A viscosity in the range of 68 to 74 kinestokes is satisfactory.

The amount of primary emulsion applied should be selected to secure the degree of fiber penetration described above. Generally, from about 200 to 500 sq.ft./gal. has been found to be useful and from 300 to 400 sq.ft./gal. is preferred, around 350 sq.ft./gal. being optimum.

Before the emulsion is allowed to set, air masses trapped under the fiber layer are squeezed from between the fiber layer and the concrete floor by use of a conventional roller or other suitable applicator using gentle pressure which does not destroy or eliminate the underlying moisture distribution passageways extending through the fiber layer.

The primary emulsion layer is allowed to stand until it cures, that is, until the solvent evaporation and polymerization reactions have proceeded to produce a solid coating. Usually from 4 to 12 hours is sufficient at ambient temperatures of at least 21° C. Longer times may be required at lower temperatures.

The cured primary surface is then smoothed, for example by sanding with a coarse sandpaper, for example 20 to 50 grit sand paper.

A secondary acrylate polymer emulsion layer 18 is then applied to the first or primary coating. The secondary acrylate polymer emulsion can but does not necessarily have the same basic composition as the primary emulsion coating. The second coating emulsion preferably has a higher viscosity so as to more readily leave a thicker upper layer on the surface. The polyacrylate for the secondary emulsion can be Rohm & Haas Polyacrylate No. 486, for example.

The amount of the secondary emulsion applied should be selected to form a uniform coating over the surface. Generally, from 800 to 2000 sq.ft./gal. has been found to be useful, about 1000 to 1600 sq.ft./gal. being preferred, and about 1300 to 1400 sq.ft./gal. being optimum.

The upper or secondary emulsion layer is allowed to stand until it cures, that is, until the solvent evaporation and polymerization reactions have proceeded to produce a solid coating. As with the primary coating, usually from 4 to 12 hours is sufficient at ambient temperatures of at least 21° C. Longer times may be required at lower temperatures.

FIG. 3 is a cross-sectional representation of the product having the intermediate floor covering formed from the components shown in FIG. 2, ready for the application of a surface sheet, tile or coating which provides for wear and conventional maintenance procedures.

FIG. 4 is a cross-sectional area of the floor covering in FIG. 3, the section line taken along the line A—A at the fiber layer-concrete interface. This view shows the random penetration of the primary coating polymer through the fiber to form localized islands of polymer 20. These islands are surrounded by open, interconnected moisture transmission passageways 22 communicating with the concrete surface and extending laterally throughout the fiber layer for redistributive diffusion under the continuous coating of moisture vapor from high emission surfaces of the concrete to lower emission surfaces of the concrete. Preferably at least fifty percent and optimally at least seventy percent of the concrete surface is open to the passageways.

These passageways are the most important aspect of the method and product of this invention. Conventional floor covering materials such as vinyl sheeting and tiles have a maximum moisture emission rating, that is, the maximum amount of moisture they will allow to pass. It is therefore important that the full emission capacity of the flooring be used when high emission concrete floors are being covered. This can be achieved by redistributing the moisture from excessively high areas of concrete surface to those areas which have lower emissions. Open, interconnected channels remaining in the final floor covering of our invention permit and facilitate this redistribution of moisture.

FIG. 5 is a cross-sectional representation applying a floor covering tile or sheet to the product shown in FIG. 3.

Conventional floor covering sheets and tiles are usually installed by applying an adhesive or mastic layer to the surface to be covered and applying the sheeting or tile directly thereto. In this procedure, the adhesive or mastic 22 is applied to the upper surface 24 of the acrylate polymer 8 by conventional procedures, for example with a trowel or similar applicator. The final floor covering material 26 is then applied thereto and the adhesive allowed to harden.

The invention has been described hereinabove for use with conventional vinyl sheeting or tiles. It will be readily apparent to a person skilled in the art that the final floor covering can be any acceptable floor covering material, and all suitable upper floor coverings are intended to the included within the scope of this invention.

It will be readily apparent to a person skilled in the art that numerous modifications and variations of the present invention are possible in light of the above teachings. It is therefore to be understood that within the scope of the appended claims, the invention may be practiced otherwise than as specifically described herein.

The invention claimed is:

1. A method for applying a high moisture permeability floor covering material to a concrete surface comprising the steps of:

a) applying a layer of inert fibers to the concrete surface, at least a portion of the fibers including inorganic fibers;

b) applying an aqueous acrylate polymer emulsion to the layer of fibers to form localized bonding penetrations of the emulsion through the layer of fibers to the concrete surface and to form a continuous coating of emulsion on the upper surface of the layer of fibers, the coated fiber layer having interconnected moisture transmission passageways communicating with the concrete surface and extending laterally throughout the fiber layer for redistributive diffusion under the continuous coating of moisture vapor from high emission surfaces of the concrete to lower emission surfaces of the concrete; and c) permitting the applied emulsion to set.

2. A method of claim 1 wherein trapped air masses are expelled from under the layer of fibers before the emulsion is set.

3. A method of claim 1 including the additional steps of:

d) applying a further layer of high viscosity aqueous acrylate polymer emulsion to said continuous coating; and e) permitting the further layer of aqueous acrylate polymer emulsion to set.

4. A method of claim 3 wherein the concrete floor has been scarified prior to applying the fiber layer thereto.

5. A method of claim 3 including the additional steps of applying a floor covering adhesive and floor covering sheet or tiles to the surface formed in step (e).

6. A method of claim 1 wherein the inert fibers are chopped glass fibers.

7. A method of claim 6 wherein the inert fibers are chopped glass fibers having a weight of from 0.5 to 1.0 oz./sq.ft.

* * * * *